United States Patent
Mizoguchi et al.

(10) Patent No.: US 11,262,806 B1
(45) Date of Patent: Mar. 1, 2022

(54) ELECTRONIC APPARATUS

(71) Applicant: LENOVO (SINGAPORE) PTE. LTD., Singapore (SG)

(72) Inventors: Fumitake Mizoguchi, Yokohama (JP); Takehito Yamauchi, Yokohama (JP); Shigehiro Horiuchi, Yokohama (JP); Sara Akiyama, Yokohama (JP)

(73) Assignee: LENOVO (SINGAPORE) PTE. LTD.

( * ) Notice: Subject to any disclaimer, the term of this patent is extended or adjusted under 35 U.S.C. 154(b) by 0 days.

(21) Appl. No.: 17/178,612

(22) Filed: Feb. 18, 2021

(30) Foreign Application Priority Data

Nov. 17, 2020 (JP) .................................. 2020190901

(51) Int. Cl.
*G06F 1/16* (2006.01)

(52) U.S. Cl.
CPC .................................. *G06F 1/1656* (2013.01)

(58) Field of Classification Search
CPC ..... G06F 1/1601; G06F 1/1616; G06F 1/1656
See application file for complete search history.

(56) References Cited

U.S. PATENT DOCUMENTS

2012/0250276 A1* 10/2012 Nakajima ............. G06F 1/1658
361/752
2020/0301186 A1* 9/2020 Nagasaki ............ G06F 3/03547

FOREIGN PATENT DOCUMENTS

JP 2020135744 A 8/2020

* cited by examiner

*Primary Examiner* — Anthony Q Edwards
(74) *Attorney, Agent, or Firm* — Shimokaji IP (57) ABSTRACT

An electronic apparatus includes a chassis; a display panel that is supported by an inner face of a cover member that defines a rear face of the chassis, the display panel having a display surface exposed to a front face of the chassis; and a support member that supports the display panel at the inner face of the cover member. The support member includes: a cover fixed portion having a cover fixed face that is fixed to the inner face of the cover member; and a panel fixed portion having a panel fixed face that is fixed to a back face of the display panel, the panel fixed portion being elastically displaceable toward the inner face of the cover member.

7 Claims, 5 Drawing Sheets

FIG. 6

ELECTRONIC APPARATUS

FIELD OF THE INVENTION

The present invention relates to electronic apparatuses including a display panel.

BACKGROUND OF THE INVENTION

An electronic apparatus such as a laptop PC includes a display panel such as a liquid crystal display (see JP 6715973 B, for example).

SUMMARY OF THE INVENTION

Such a display panel is placed at the inner face of a cover member defining the rear face of the chassis via sponges inserted at the four corners, for example, and is supported at the chassis with an adhesive force of a bezel member surrounding the outer peripheral of the display surface. The bezel member adheres to the outer peripheral edge of the display surface and the peripheral wall of the chassis so as to extend between them, and presses the display panel.

Recently such a bezel member has been required to be narrow as possible for better appearance quality. As a result, it is difficult for the bezel member to keep a sufficient adhesive area, and so it is difficult to stably fix the display panel with the bezel member.

In view of the problems of the conventional techniques, the present invention provides an electronic apparatus including a narrow bezel member and capable of supporting the display panel stably.

An electronic apparatus according to a first aspect of the present invention includes: a chassis; a display panel that is supported by an inner face of a cover member that defines a rear face of the chassis, the display panel having a display surface exposed to a front face of the chassis; and a support member that supports the display panel at the inner face of the cover member. The support member includes: a cover fixed portion having a cover fixed face that is fixed to the inner face of the cover member; and a panel fixed portion having a panel fixed face that is fixed to a back face of the display panel, the panel fixed portion being elastically displaceable toward the inner face of the cover member.

The above-described aspect of the present invention supports the display panel stably while having a narrow bezel member.

DETAILED DESCRIPTION OF THE INVENTION

Referring to the drawings, the following describes an electronic apparatus according to the present invention in details by way of a preferable embodiment.

Figure 1:
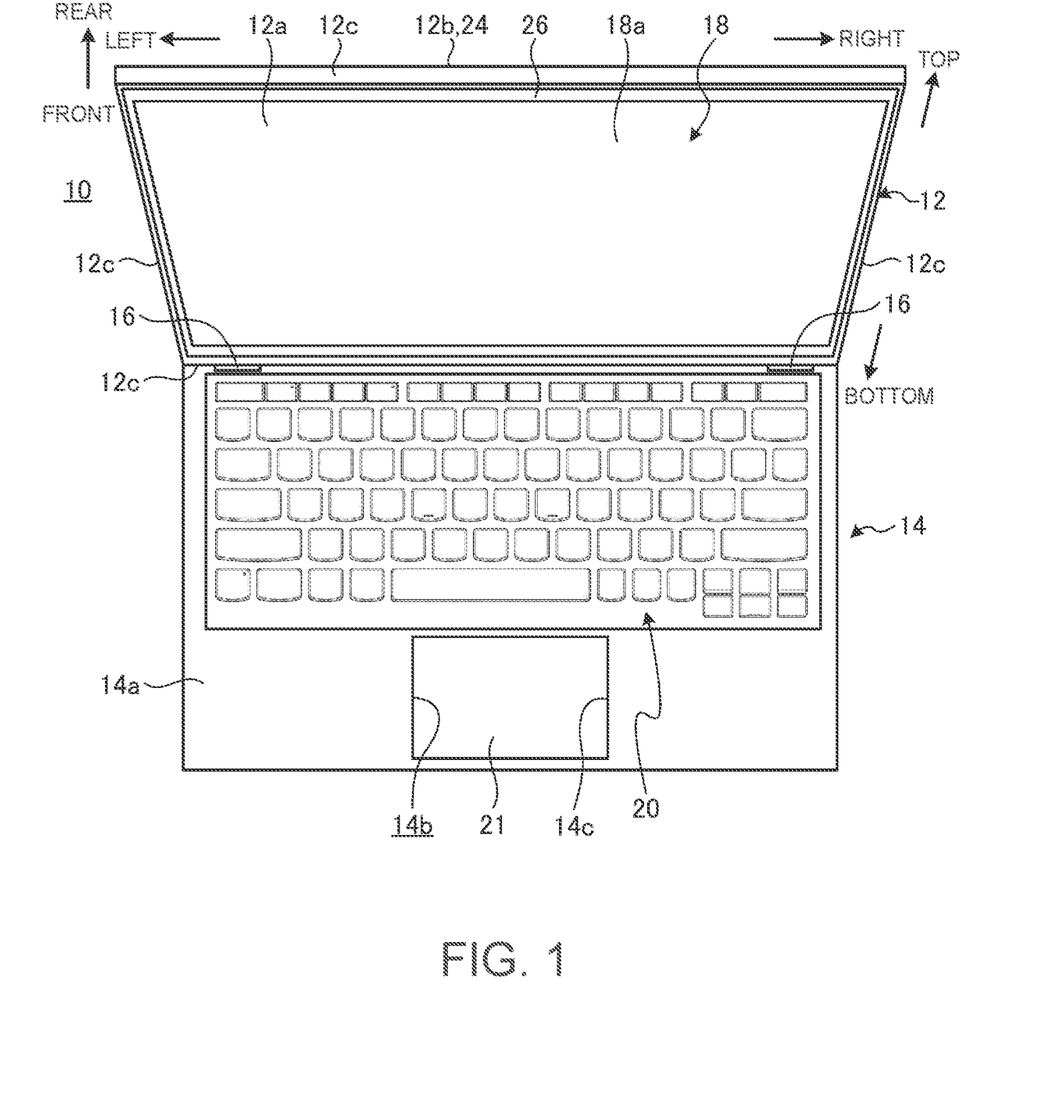
FIG. 1 is a schematic top plan view of an electronic apparatus according to one embodiment.

FIG. 1 is a schematic top plan view of an electronic apparatus 10 according to one embodiment. As illustrated in FIG. 1, the electronic apparatus 10 is a clamshell-type laptop PC including a first chassis 12 and a second chassis 14 that are relatively rotatably connected with hinges 16. The first chassis 12 is a display chassis including a display panel 18. The second chassis 14 includes input devices such as a keyboard 20 and a touch pad 21, and other devices such as a motherboard.

The electronic apparatus 10 is configured so that the chassis 12 and 14 are rotatable between the storage mode (see FIG. 6) and the usage mode (see FIG. 1). In the storage mode, the plane directions of the chassis 12 and 14 are substantially parallel to each other and their crossing angle is close to 0 degree, for example. In the usage mode, the crossing angle of the chassis 12 and 14 is from about 90 degrees to 140 degrees, for example. The rotation range between the chassis 12 and 14 may be 140 degrees or more. Instead of a laptop PC, the electronic apparatus of the present invention may be of various types including a display device having a single chassis, a tablet PC, a mobile phone, a smartphone, and a portable game machine.

In the following description, based on the mode of the electronic apparatus 10 having the chassis 12 and 14 at 90 degrees (the plane directions of the chassis 12 and 14 are mutually orthogonal), the direction toward the user using the keyboard 20 while viewing the display surface 18a of the display panel 18 is front, the direction away from the user is rear, the width direction of the chassis is left and right, and the vertical direction is top and bottom. These directions are for convenience of explanation, and their actual directions change depending on the posture of the electronic apparatus 10 and the angle between the chassis 12 and 14.

First the following roughly describes the configuration of the second chassis 14.

The second chassis 14 is a flattened box. The second chassis 14 internally stores a motherboard with a CPU and the like mounted thereon and various types of electronic components such as a battery device, a memory, and an antenna device. The keyboard 20 and the touch pad 21 are placed to be exposed to the top face 14a of the second chassis 14. The keyboard 20 extends to almost the entire width of the top face 14a to the left and right, and occupies a rear area that is about 60% of the top face 14a. The touch pad 21 has a left-right width that is about 30% of the top face 14a, and is placed in front of the keyboard 20 and near the center of the top face 14a.

The touch pad 21 enables touch operation and clicking operation, for example, and is also called a click pad. The plate member defining the top face 14a has an opening 14b to place the touch pad 21. The touch pad 21 is placed in the opening 14b at a position slightly lower than the top face 14a. A step is defined between the outer peripheral edge of the touch pad 21 and the inner peripheral edge of the opening 14b. This step leaves a rim (edge 14c) of the inner peripheral edge of the opening 14b at the top face 14a (see FIG. 6).

Next the following roughly describes the configuration of the first chassis 12.

The first chassis 12 is a flattened box and is thinner than the second chassis 14. The display panel 18 is placed in the first chassis 12 so that the display surface 18a is exposed to the front face 12a. The first chassis 12 has a cover member 24 that defines a rear face (back face) 12b, and a bezel member 26 that defines a peripheral edge of the front face 12a. The top, bottom, left, and right side faces 12c of the first chassis 12 are formed with standing walls that rise from the four peripheral edges of the cover member 24. The cover member 24 may include a plate defining the rear face 12b only, and the side faces 12c may be formed with a separate frame. The first chassis 12 has a bottom edge relatively rotatably connecting to the rear edge of the second chassis 14 via the hinges 16.

The display panel 18 is a liquid crystal display or an organic EL display, for example. In one example, the display panel 18 is configured so that layers including a glass sheet, a liquid crystal layer, and a light guide plate are stacked and the outer peripheral edges of these layers are fixed with double-sided tape, an adhesive, or the like. The display panel 18 may be of a touch panel type.

Next the following describes the specific configuration of the first chassis 12.

Figure 2:
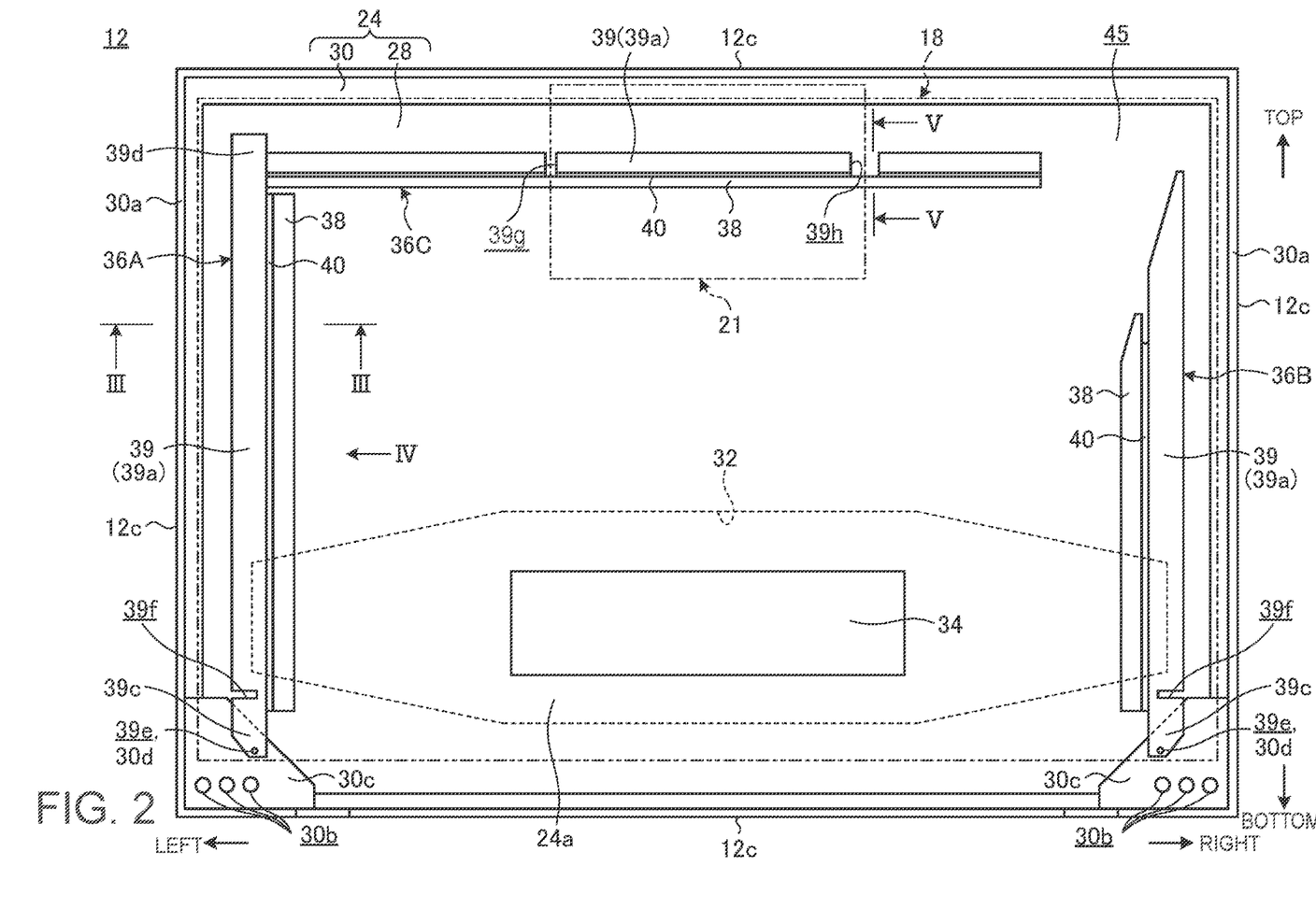
FIG. 2 is a schematic front view of the first chassis viewed from the front face.
Figure 3:
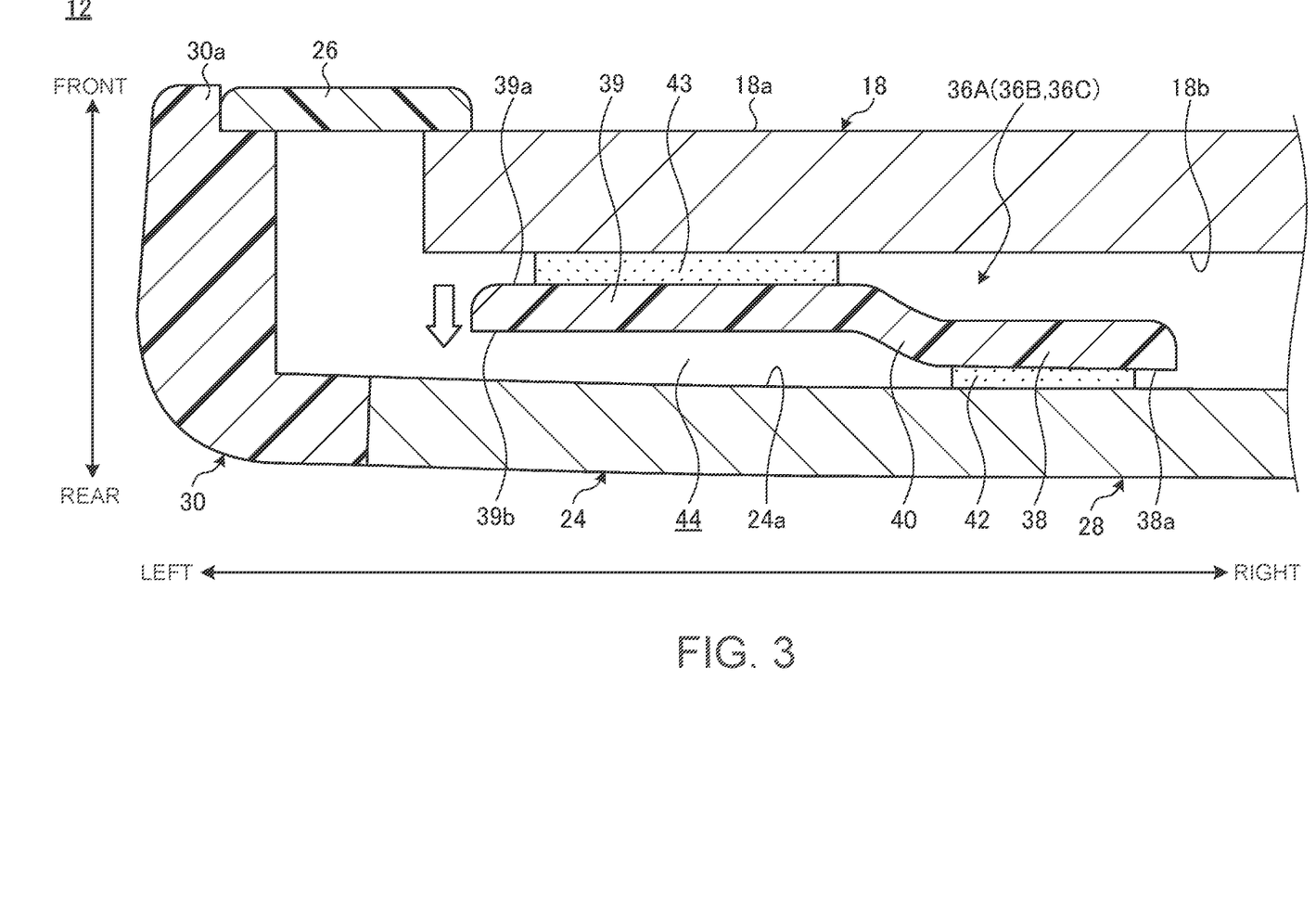
FIG. 3 is a schematic cross-sectional view taken along the line III-III in FIG. 2.

FIG. 2 is a schematic front view of the first chassis 12 viewed from the front face 12a. FIG. 3 is a schematic cross-sectional view taken along the line III-III in FIG. 2. FIG. 2 omits the bezel member 26, and illustrates only the outer shape of the display panel 18 with the alternate long and two short dashes line. FIG. 2 therefore illustrates the inner face 24a of the cover member 24 (the face on the reverse side of the rear face 12b) and various components mounted on the inner face 24a.

First the following describes the configuration of the cover member 24.

As illustrated in FIGS. 2 and 3, the cover member 24 of the present embodiment has a rectangular plate portion 28 that occupies most part including the central portion, and a frame portion 30 that is joined to the outer peripheral edge of the plate portion 28.

In one example, the plate portion 28 includes a prepreg laminated plate, a resin plate, or a plate made of metal such as aluminum or titanium. The prepreg laminated plate is prepared by stacking a plurality of layers of prepregs, each of which includes reinforcing fibers such as carbon fiber impregnated with matrix resin (thermosetting resin such as epoxy resin or thermoplastic resin, for example). Depending on the specifications, intermediate materials such as foam may be sandwiched between the prepreg layers. The plate portion 28 of the present embodiment is a carbon fiber reinforced plastics plate (CFRP plate) containing carbon fibers as the reinforcing fibers.

The frame portion 30 is formed by injection molding a resin material on the outer peripheral edge of the plate portion 28 and joining them. Examples of the resin material of the frame portion 30 include polyethylene resin and polypropylene resin. Fiber reinforced resin (for example, GFRP) including reinforcing fibers such as glass fibers mixed with these resins may be used. The plate portion 28 formed with the carbon fiber reinforced plastics plate is light and has high strength, but has a problem in the workability of machining and shaping. Then, the cover member 24 includes the frame portion 30 made of a resin material around the plate portion 28, and a vertical wall 30a defining the side faces 12c and screw holes 30b for fixing the hinges 16 are formed in this frame portion 30. The screw holes 30b are formed in thick portions 30c at the left and right lower corners of the cover member 24. The thick portions 30c are thick parts of the frame portion 30 that are thickened on the inner face 24a relative to the other parts.

As indicated with the broken line in FIG. 2, the inner face 24a of the cover member 24 of the present embodiment has a recess-like curved shape 32 where the inner face 24a is smoothly recessed. The curved shape 32 is a dish-shaped depression of the inner face 24a so that a part or all of the plate portion 28 bulges toward the rear face 12b. That is, the cover member 24 has a dome shape in which a part or all of the rear face 12b slightly bulges rearward. FIG. 2 schematically illustrates the curved shape 32 that is a substantially hexagonal shape, and actually the curved shape 32 is an elliptical concave that is gently inclined over most of the plate portion 28.

The curved shape 32 (dome shape) defines a space having a certain height between the inner face 24a and the back face 18b of the display panel 18. As illustrated in FIG. 2, this space is an installation space for a control board 34 of the display panel 18. The control board 34 controls the display on the display panel 18, and is connected to the motherboard, for example, in the second chassis 14 via a flexible printed circuit (FPC) board.

Figure 4:
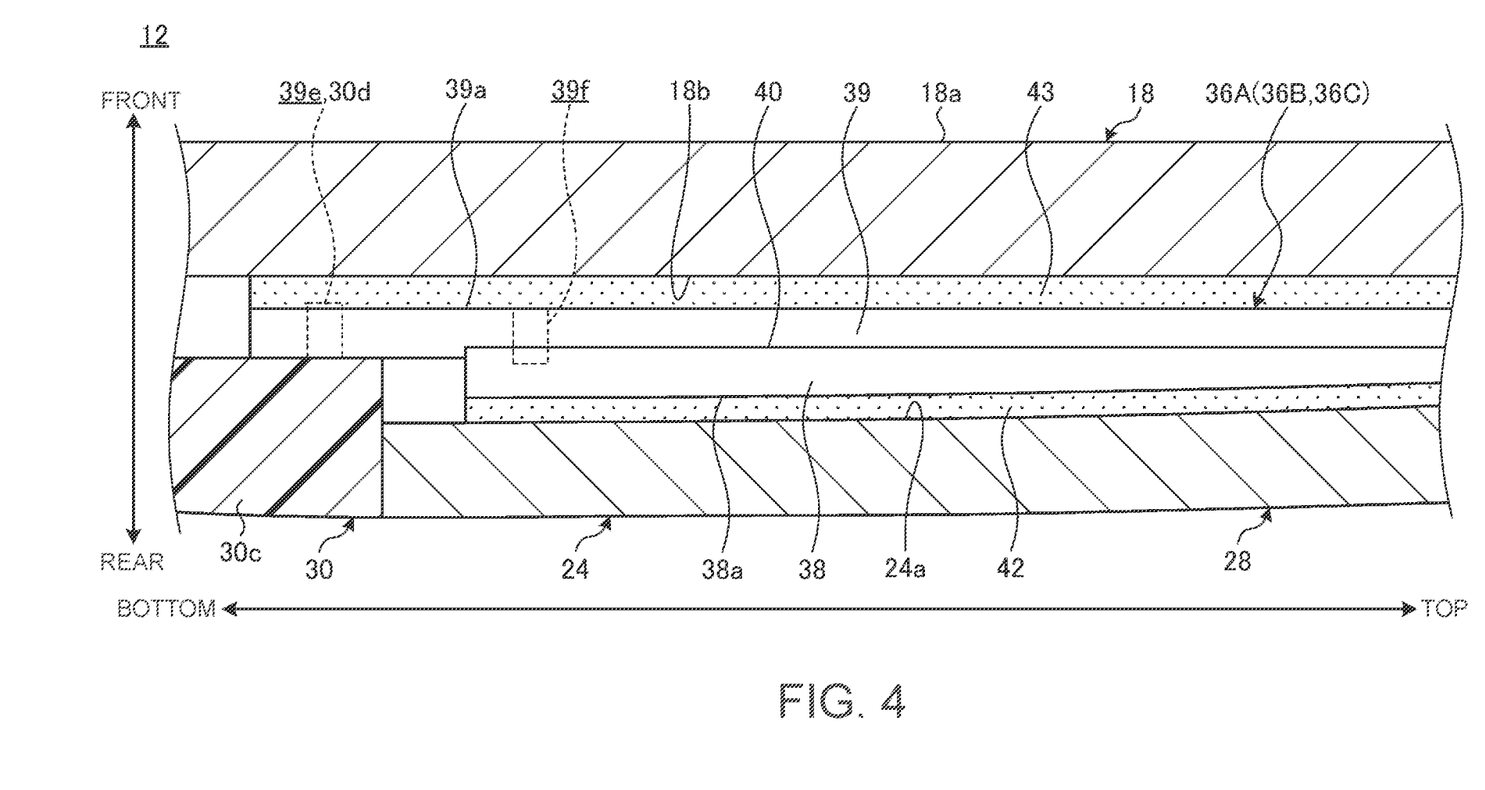
FIG. 4 is a schematic view from the arrow IV in FIG. 2.

Next the following describes the supporting structure of the display panel 18 at the first chassis 12. FIG. 4 schematically illustrates the supporting structure viewed from the arrow IV in FIG. 2, and illustrates a part thereof in cross section.

As illustrated in FIG. 2, three support members 36A, 36B, and 36C are disposed on the inner face 24a of the cover member 24. The support members 36A to 36C are pedestals for supporting the display panel 18 with the inner face 24a of the cover member 24. The support members 36A and 36B extend along the left and right sides (left and right side faces 12c) of the cover members 24 that face each other and extend vertically. The support member 36C extends along the upper side (top side face 12c) of the cover members 24 that extends horizontally. The number of support members may be changed as appropriate. Each of the support members 36A to 36C may include two or more short plates disposed side by side instead of a long single plate.

The present embodiment does not have a support member along the lower side (bottom side face 12c) of the cover member 24 that extends horizontally. This is a space to place the hinges 16 and the flexible printed circuit (FPC) board from the control board 34, and so it is difficult to place such a support member there. In another embodiment, the support member may be placed along the lower side.

Although the support members 36A to 36C may have different overall lengths, widths, end shapes, etc., they have basically the same configuration. The following therefore describes the support member 36A on the left in FIG. 2 as an example, and describes the features different from the support member 36A about the other support members 36B and 36C. Like reference numerals indicate common parts, and the description will be omitted as appropriate.

As illustrated in FIGS. 2 to 4, the support member 36A (36B, 36C) has a cover fixed portion 38, a panel fixed portion 39, and a step 40. The support member 36A (36B, 36C) is a stepped plate that is bent in a substantially Z-shape or a crank shape in cross section. In one example, the support member 36A (36B, 36C) is made of a resin such as polymer alloy (PC/ABS resin) of a polycarbonate resin and an ABS resin. The support members 36A to 36C may be made of a material other than resin, such as metal, as long as it can achieve the elastic displacement of the panel fixed portion 39 described later.

The cover fixed portion 38 is a portion fixed to the cover member 24. The cover fixed portion 38 has a cover fixed face 38a on the rear (bottom in FIG. 3) that is fixed to the inner face 24a of the cover member 24 with double-sided adhesive tape 42.

The panel fixed portion 39 is a portion fixed to the display panel 18. The panel fixed portion 39 has a panel fixed face 39a on the front (top in FIG. 3) that is fixed to the back face 18b of the display panel 18 with double-sided adhesive tape 43. The cover fixed portion 38 is fixed to the cover member 24 so that the panel fixed portion 39 slightly floats from the inner face 24a. That is, a gap 44 is defined between the back face 39b of the panel fixed face 39a and the inner face 24a. This gap 44 enables the elastic displacement of the panel fixed portion 39 in the front-rear direction (direction perpendicular to the drawing plane of FIG. 2).

As illustrated in FIGS. 2 and 3, the support member 36A (36B, 36C) is configured so that the panel fixed face 39a has a larger surface area than the cover fixed face 38a. In the present embodiment, the width of the panel fixed face 39a (the width in the direction orthogonal to the longitudinal direction) is larger than the width of the cover fixed face 38a. The support members 36A and 36B are each configured so that the panel fixed face 39a has a longer overall length than that of the cover fixed face 38a. This means that the panel fixed face 39a has a larger surface area. This also means that the double-sided adhesive tape 43 for the panel fixed face 39a has a larger adhesive area than that of the double-sided adhesive tape 42 for the cover fixed face 38a.

The step 40 is a part between the cover fixed portion and the panel fixed portion 39, and gives a height difference between these portions. The step 40 is a portion corresponding to a riser of a staircase, for example. In one example, the step 40 of the present embodiment is formed with an inclined plate that gradually rises from the cover fixed portion 38 toward the panel fixed portion 39. The step 40 may have any shape as long as the panel fixed portion 39 defines the gap 44 with the inner face 24a to enable the elastic displacement of the panel fixed portion 39.

The step 40 may be omitted. In this case, the support member 36A (36B, 36C) may be formed in a laterally U-shape or O-shape in cross section to enable the elastic displacement of the panel fixed portion 39. The support member 36A (36B, 36C) preferably has a stepped shape as illustrated in FIG. 2 to minimize the overall thickness (thickness in the front-rear direction).

These support members 36A to 36C extend in the vertical direction and the horizontal direction along the corresponding sides (top, left and right sides 12c) of the cover member 24 and in the vicinity of the sides. For each of the support members 36A to 36C, the cover fixed portion 38 is located inside of the cover member 24 (toward the center), and the panel fixed portion 39 is located outside of the cover member 24 (toward the outer edge). The display panel 18 is a laminated body of a plurality of members as described above, and the outer edges of the members are fixed to each other. With this configuration, the load on the outer edge portion of the display panel 18 is unlikely to cause a problem, but the load on the central portion causes damage of the display panel 18. To avoid this damage, the panel fixed face 39a needs to be fixed to the outer edge of the display panel 18 as much as possible. To this end, the support members 36A to 36C of the present embodiment are configured so that the panel fixed portion 39 is located outside of the cover member 24 to support the outer edge of the display panel 18.

Next, the following describes a configuration unique to each of the support members 36A to 36C.

In order to support the flat back face 18b of the display panel 18, the panel fixed faces 39a of the support members 36A to 36C need to be placed entirely on a single plane (support plane). In contrast, the inner face 24a of the cover member 24 has the curved shape 32. In particular, the cover fixed faces 38a of the left and right support members 36A and 36B overlap the curved shape 32. The left and right support members 36A and 36B therefore each include the cover fixed face 38a with a curved surface matching the curved shape 32 (see FIGS. 3 and 4), and this allows the panel fixed face 39a to be placed on the support plane even on the curved shape 32. When the support member 36C also overlaps the curved shape 32, its cover fixed face 38a may have a curved surface.

As illustrated in FIGS. 2 and 3, the support member 36A on the left includes the panel fixed portion 39 that is longer than the cover fixed portion 38. The panel fixed portion 39 of the support member 36A has protruding portions 39c and 39d whose both ends protrude from both ends of the cover fixed portion 38. The protruding portion 39c close to the bottom of FIG. 2 has a small positioning hole 39e. The protruding portion 39c is placed on the thick portion 30c and fits with the positioning pin 30d on the thick portion 30c (see also FIG. 4). This configuration positions the support member 36A relative to the cover member 24. The support member 36A (36B, 36C) is positioned also using the scratched line drawn on the inner face 24a of the cover member 24. The protruding portion 39d close to the top in FIG. 2 enables positioning of the support member 36C by abutting it with the left end of the support member 36C.

The panel fixed portion 39 of the support member 36A has a slit-like cutout 39f in the vicinity of the protruding portion 39c. The cutout 39f is formed by cutting from the panel fixed portion 39 to the step 40 in the width direction (left-right direction). As illustrated in FIG. 4, the cutout 39f separates the protruding portion 39c, which is positioned on the thick portion 30c, from the other portion. This prevents the thick portion 30c from interfering with the elastic displacement of the panel fixed portion 39.

The support member 36B on the right also has a protruding portion 39c, a positioning hole 39e, and a cutout 39f. The support member 36B has a substantially horizontally symmetrical shape with the support member 36A, and is significantly different only in the shape of the upper end portion. The upper end of the support member 36B is cut diagonally to have a gap 45 with the right end of the adjacent support member 36C. The gap 45 is a path to install the FPC that is connected to a camera or a microphone placed along the upper side of the first chassis 12 and extends from the lower side to the second chassis 14. The support member 36B may have a completely horizontally symmetrical shape with the support member 36A.

As described above, the electronic apparatus 10 of the present embodiment includes the support members 36A to 36C that support the display panel 18 at the inner face 24a of the cover member 24 of the first chassis 12. The support members 36A to 36C each include the cover fixed portion 38 having the cover fixed face 38a fixed to the inner face 24a, and the panel fixed portion 39 having the panel fixed face 39a fixed to the back face 18b of the display panel 18. The panel fixed portion 39 is elastically displaceable toward the inner face 24a of the cover member 24.

The electronic apparatus 10 therefore supports the display panel 18 with the cover member 24 via the support members 36A to 36C and not via the bezel member 26. The electronic apparatus 10 therefore stably supports the display panel 18 while including the bezel member 26 that is narrow as possible, and also includes the first chassis 12 that is compact and has improved appearance quality. When the display panel 18 receives a pressing force during the stacking process or during a user's operation with the touch panel, the elastic displacement of the panel fixed portion 39 absorbs this pressing force. With this configuration, the electronic apparatus 10 suppresses damage to the display panel 18, such as display abnormalities called black spots and white spots, and broken glass.

The support members 36A to 36C are each configured so that the panel fixed face 39a has a larger surface area than that of the cover fixed face 38a. The display panel 18 has to be removed from the cover member 24 during maintenance such as replacement of the display panel 18. In this case, it is preferable to remove the display panel 18 from the panel fixed face 39a and leave the support members 36A to 36C fixed to the cover member 24. This is because the cover fixed face 38a has a curved surface that matches the curved shape 32, and once removed, the following positioning operation will be complicated. The support members 36A to 36C of the present embodiment therefore are configured so that the cover fixed face 38a is strongly fixed to the inner face 24a and the display panel 18 is removable from the panel fixed portion 39.

For the double-sided adhesive tape 42 that does not need to be removed, a tape with a strong adhesive force can be used. The cover fixed face 38a therefore can exert a sufficient adhesive force even with a small surface area. The cover fixed face 38a therefore may have a minimum size, and the installation space of the cover fixed face 38a in the first chassis 12 can be kept small. In contrast, for the double-sided adhesive tape 43 that needs to be removed, a tape having a smaller adhesive force than the double-sided adhesive tape 42 has to be used. The panel fixed face 39a therefore has a large surface area to make up for the insufficient adhesive force of the double-sided adhesive tape 43, and prevents the display panel 18 from rattling. For the double-sided adhesive tape 43, a tape called stretch release tape, stretch double-sided tape, or stretchable tape may be used, which is releasable by pulling out with a tab, for example.

Figure 5:
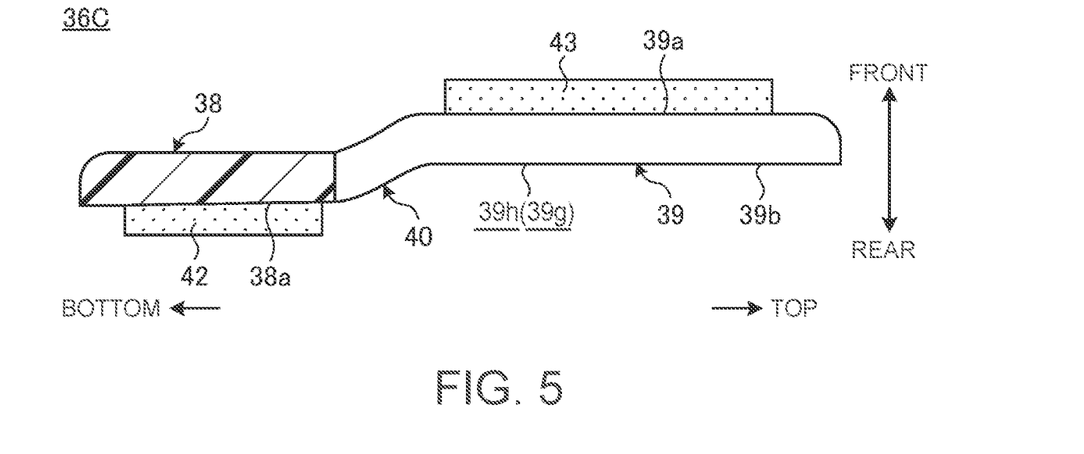
FIG. 5 is a schematic cross-sectional view taken along the line V-V in FIG. 2.
Figure 6:
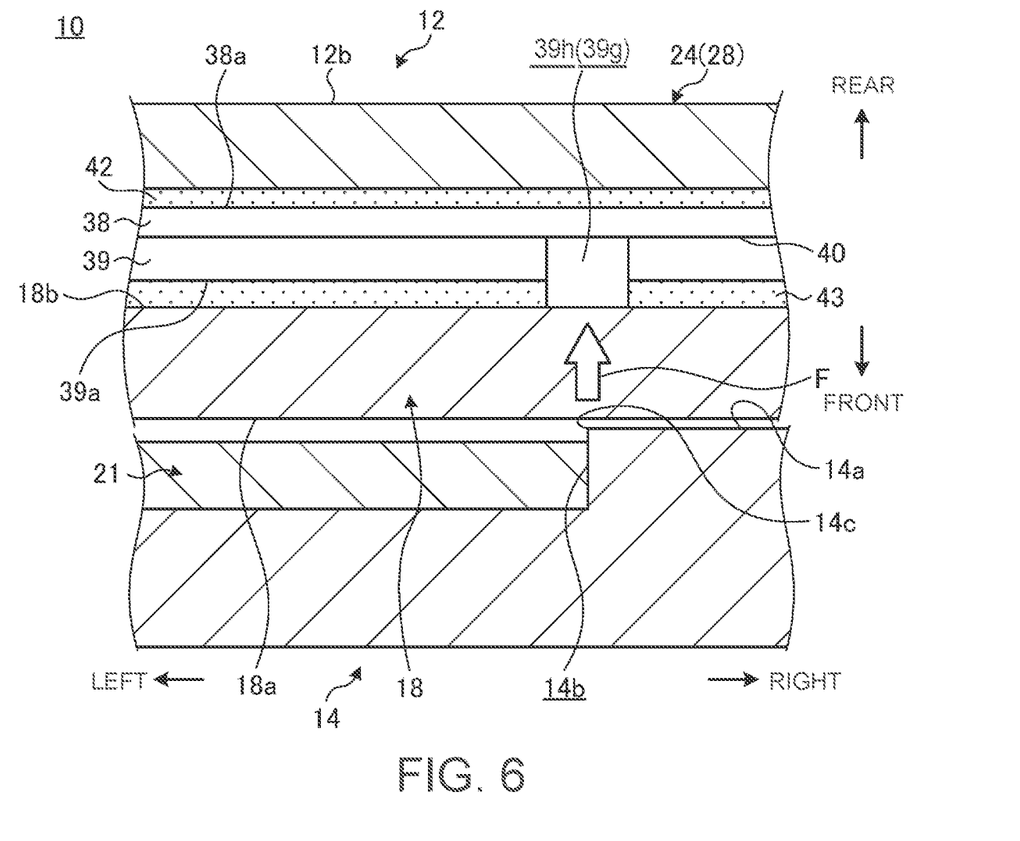
FIG. 6 is an enlarged schematic cross-sectional view of a touch pad and its peripheral when the chassis are in the storage mode.

FIG. 5 is a schematic cross-sectional view taken along the line V-V in FIG. 2. FIG. 6 is an enlarged schematic cross-sectional view of the touch pad 21 and its peripheral when the chassis 12 and 14 are in the storage mode. FIG. 5 omits the members other than the support member 36C and the double-sided adhesive tapes 42 and 43. The specific structure of the cutout 39f in FIG. 2 is the same as that of the cutout 39h (39g) in FIG. 5.

As illustrated in FIGS. 2 and 5, the panel fixed portion 39 of the support member 36C close to the top has a pair of left and right slit-like cutouts 39g and 39h. As indicated with the alternate long and two short dashes line in FIG. 2, the cutouts 39g and 39h are positioned so as to overlap the edges 14c along the left and right edges of the touch pad 21 in the direction of stacking the chassis 12 and 14 to be in the storage mode (see also FIG. 6).

Assume the case where, in the storage mode of FIG. 6, the rear face 12b of the first chassis 12 receives an external pressure, so that the display surface 18a of the display panel 18 is pressed against the top face 14a of the second chassis 14. In this case, the left and right edges 14c are at the positions overlapping the support member 36C in the stacking direction of the chassis 12 and 14 (see FIG. 2). As a result, the display panel 18 may receive an intensive load F from the edge 14c as illustrated in FIG. 6. In this case, the load F cannot be absorbed only by the elastic displacement of the panel fixed portion 39, and the display panel 18 may be damaged by the local high pressure due to the edge 14c.

To avoid this, the support member 36C of the present embodiment has the cutouts 39g and 39h at positions overlapping the edges 14c, and this enables smooth absorption of the load F and suppresses damage of the display panel 18. If the support members 36A and 36B may interfere with other edges on the top face 14a, the support members 36A and 36B may also have such cutouts 39g and 39h.

The present invention is not limited to the above-described embodiments, and can be modified freely without deviating from the scope of the present invention.

The above embodiments describe the example where the cover member 24 has the curved shape 32. In another embodiment, the cover member 24 may have a flat surface.

The invention claimed is:

1. An electronic apparatus comprising:
   a chassis;
   a display panel that is supported by an inner face of a cover member that is a rear face of the chassis, the display panel having a display surface exposed to a front face of the chassis; and
   at least one support member that supports the display panel at the inner face of the cover member,
   the at least one support member including:
      a cover fixed portion having a cover fixed face that is fixed to the inner face of the cover member; and
      a panel fixed portion having a panel fixed face that is fixed to a back face of the display panel, the panel fixed portion being elastically displaceable toward the inner face of the cover member.

2. The electronic apparatus according to claim 1, wherein the at least one support member includes a stepped plate having a step between the cover fixed portion and the panel fixed portion, and
the cover fixed portion of the at least one support member fixed to the inner face of the cover member is disposed away from the inner face of the cover member to provide a gap between the panel fixed portion and the inner face of the cover member.

3. The electronic apparatus according to claim 2, wherein the at least one support member includes at least a pair of support members, and the cover fixed portion and the panel fixed portion of each support member extend along a pair of opposed sides of the cover member, and
each support member is configured so that the cover fixed portion is adjacent to a center of the cover member, and the panel fixed portion is adjacent to an outer edge of the cover member.

4. The electronic apparatus according to claim 1, wherein the at least one support member is configured with the panel fixed face having a larger surface area than that of the cover fixed face,
the cover fixed face is fixed to the inner face of the cover member with a first adhesive tape, and
the panel fixed portion is fixed to a back face of the display panel with a second adhesive tape having an adhesive force less than the first adhesive tape.

5. The electronic apparatus according to claim 1, wherein the cover member has a curved-shaped recess where the inner face is smoothly recessed,
the cover fixed face includes a curved face that follows the curved shape of the recess, and
the panel fixed face is a flat surface.

6. The electronic apparatus according to claim 1, wherein the cover member includes a frame portion joined to an outer peripheral edge of a plate portion of the cover member, the plate portion includes a fiber reinforced resin including reinforcing fibers impregnated with a resin material, and
the at least one support member has a positioning hole that receives a positioning pin on the frame portion.

7. The electronic apparatus according to claim 1, further comprising:

a second chassis connected, via a hinge, to the chassis, the second chassis includes an input device on a top face of the second chassis and includes an edge at a rim of the input device, wherein the chassis and the second chassis are rotatably connected to one another and moveable between at least a storage mode in which the chassis and the second chassis are stacked to overlap each other so that the display surface of the display panel faces the input device and a usage mode in which the chassis stands so that both the display surface of the display panel and the input device are exposed to outside of the electronic apparatus, and the panel fixed portion has a cutout at a position overlapping the edge of the second chassis, in a stacking direction of the chassis and the second chassis in the storage mode.

\* \* \* \* \*